March 18, 1969   A. S. EDWARDS   3,432,876
WASHER NOZZLE ASSEMBLY
Filed Nov. 4, 1966
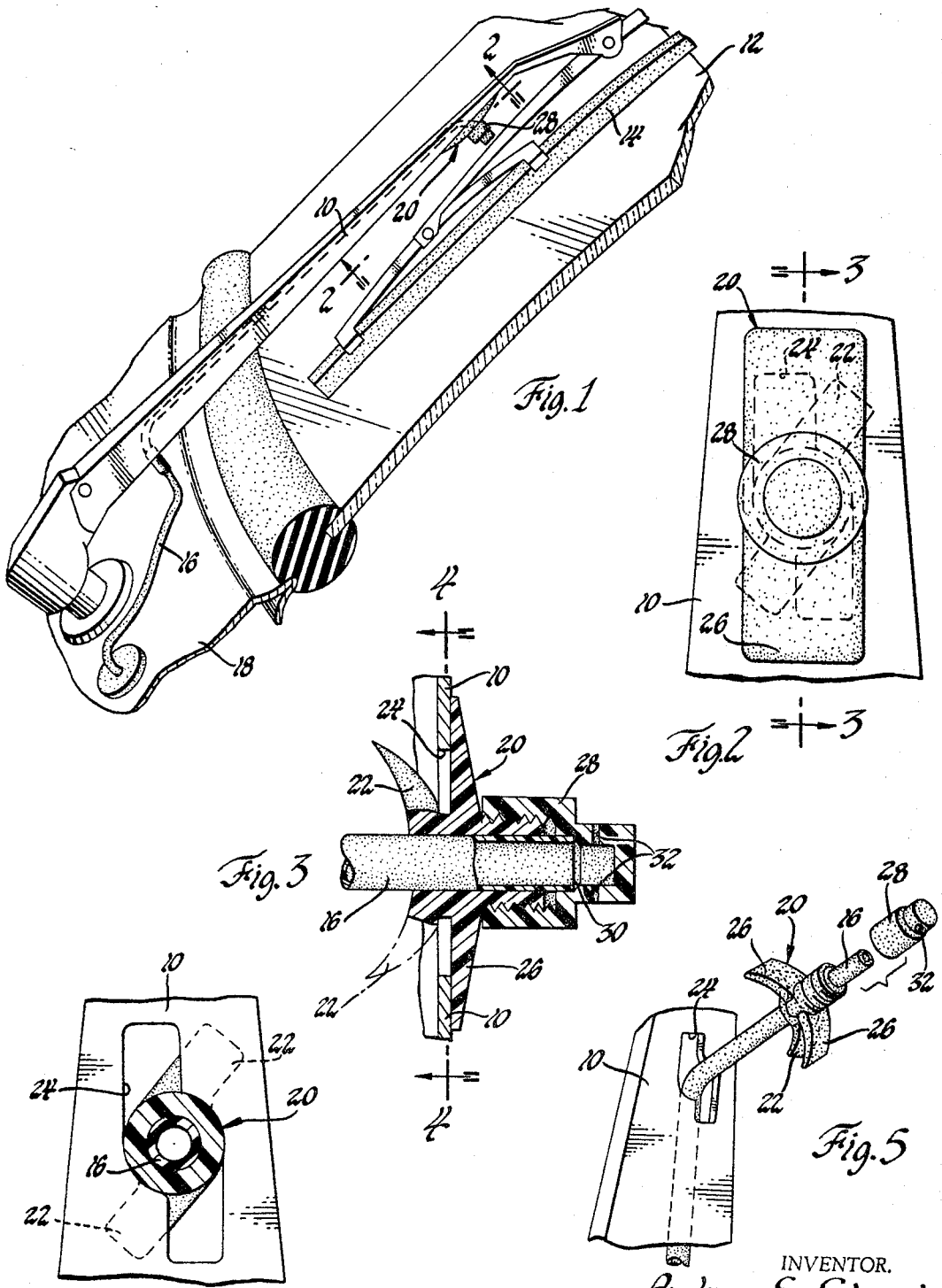
INVENTOR.
Andrew S. Edwards
BY
Donald P. Selucki
ATTORNEY United States Patent Office 3,432,876
Patented Mar. 18, 1969

3,432,876
WASHER NOZZLE ASSEMBLY
Andrew S. Edwards, Rochester, N.Y., assignor to General Motors Corporation, Detroit, Mich., a corporation of Delaware
Filed Nov. 4, 1966, Ser. No. 592,221
U.S. Cl. 15—250.04
Int. Cl. B60s 1/52, 1/32
6 Claims

ABSTRACT OF THE DISCLOSURE

In a preferred form, this disclosure relates to a fluid delivery system for supplying washing fluid from a source onto a window of an automotive vehicle. The system comprises a wiper-washer arm, a flexible tube extending through the arm and having one end which is adapted to be connected with a source of washing fluid and a dispensing means connected to the arm and to the other end of the flexible tube for dispensing fluid when delivered thereto onto the window of the vehicle. The wiper-washer arm has a wall portion provided with a non-circular opening therein and the dispensing means includes a fastener means having spaced resilient flanges which frictionally grip opposite sides of the wall portion of the wiper-washer arm when connected thereto. One of the flanges of the fastener means is shaped complementary with the non-circular opening and is freely insertable therethrough. The fastener means is connected to the wall portion by inserting the one flange through the opening therein and then rotating the fastener means so that portions of the one flange and the other flange are disposed on and frictionally engage the opposite sides of the wall portion. The dispensing means also includes a nozzle means and the nozzle means and the fastening means are in sealing engagement with the other end of the flexible tube.

---

This invention relates to windshield washing mechanisms and more particularly to apparatus designed to deliver fluid from a fluid reservoir to a windshield wiper nozzle near a vehicle windshield.

It is a common practice in the design of windshield washer mechanisms to have a washer nozzle positioned on the cowl of the vehicle with an outlet directed toward a target area on the windshield which is deemed by the designer of the system to best provide fluid for a washing action. Due to air turbulence across a vehicle windshield during movement thereof and other impediments, the target area is not always struck by a maximum amount of washing fluid under all conditions of operation. The windshield wiper arm is the nearest structural part to the area that is most desirably positioned relative to a target area but it is a moving part. It is obvious that certain problems exist in transferring fluid from a relatively fixed portion of a vehicle to a portion movable relative thereto.

It is an object of the present invention to provide a fluid delivery system of an improved type that is adapted to transfer fluid from a relatively fixed member to a movable member during movement of the movable member.

It is another object of the present invention to provide an improved windshield washer fluid delivery system which delivers the fluid to a point proximate the target area on the windshield from which position the washing fluid can be most efficiently utilized.

It is still another object of the present invention to provide improved windshield washing apparatus which is very simple and economical to manufacture and which can be installed on a vehicle as a replacement part therefor.

It is a further object of the present invention to provide improved windshield washing apparatus which holds a flexible fluid transfer hose operably positioned on a windshield washer arm without using any fastening means not integral to the connecting device and which is easily adaptable for removal for maintenance purposes.

Further objects and advantages of the present invention will be apparent from the following description, reference being had to the accompanying drawings wherein a preferred embodiment of the present invention is clearly shown.

In th drawings:

FIGURE 1 illustrates the subject invention in its operative environment;

FIGURE 2 is a sectional view of the subject invention viewed in the direction of arrow 2 in FIGURE 1;

FIGURE 3 is a sectional view taken along line 3—3 of FIGURE 2;

FIGURE 4 is a sectional view taken along line 4—4 of FIGURE 3;

FIGURE 5 is an exploded perspective view of the fastening means of the subject invention.

Referring to FIGURE 1, a windshield wiper arm 10 is driven in any well-known manner across the windshield 12, wiper blade 14 carried by arm 10 contacting the windshield surface. Flexible line 16 originates in a washing fluid reservoir, not shown, and extends from a vehicle cowl 18 to arm 10. Flexible line 16 passes through the interior portion of arm 10 and terminates in a position wherein it protrudes through arm 10 to the exterior thereof, as best seen in FIGURE 3.

Referring to FIGURE 3, a fastening means is generally designated by numeral 20. Fastening means 20 is composed of any well-known resilient material, such as a thermosetting plastic, which assumes a free form as indicated in FIGUIE 5. When operatively positioned, as shown in FIGURE 3, a first level or flange 22 of fastening means 20 protrudes through aperture 24 in arm 10 and a second level or flange 26 is operatively positioned on the opposite side of arm 10 from first level 22.

Nozzle 28 threadingly engages an extension of fastening means 20 and sealingly engages the end of flexible line 16 along line 30. Outlets 32 dispense fluid normally introduced through line 16 under pressure. Outlets 32 are positioned so that dispensed fluid strikes windshield 12 in the desired target area.

Fastening means 20, as seen in FIGURE 5, is adapted to slip over flexible line 16 when line 16 is threaded through arm 10 and out through arm aperture 24. First level 22 of fastening means 20 is pushed in through aperture 24 while sliding along line 16, it being understood that the configuration of first level 22 substantially corresponds to the shape of aperture 24 which, as clearly shown in FIGURE 4, is non-circular and has offset slot or terminal portions.

When first level 22 enters aperture 24, fastening means 20 is rotated clockwise, as shown in FIGURES 2 and 3 by the dotted lines, whereby compressing second level 26 to a substantially flat shape, as seen in FIGURE 3. As previously stated, second level 26 has a free form, as seen in FIGURE 5, so that fastening means 20, when twisted after the entry of first level 22 into aperture 24, resiliently grips arm 10 holding fastening means 20 operatively positioned. It should be noted that, when second level 26 flattens to the configuration, as shown in FIGURE 3, a displacement of the plastic material occurs in the direction of line 16 causing fastening means 20 to frictionally engage the outer surface of line 16 holding it in the desired position.

Thereafter, tube or line 16 can be clipped to a desired length wherein it protrudes slightly from the threaded extension of fastening means 20. Thereafter, nozzle 28 can be screwed on the threaded extension until it bottoms out desirably at a point where contact is made with the clipped end of line 16 along line 30 on the interior portion of nozzle 28. This provides an added seal for the washing fluid as well as preventing the casual entrance of foreign material that may be pushed from nozzle 28 or fastening means 20 during the threading engagement thereof. Preferably, there is sufficient resilience in fastening means 20 to allow nozzle 28 to be turned to a position wherein outlets 32 are directed at the target area on the windshield.

In operation, the windshield washing mechanism is put under pressure when desired while blade 14 traverses a sweep pattern across windshield 12. Flexible line 16 is pressurized and fluid under pressure is delivered to outlets 32. As taught by many systems in the prior art, the pressurizing of line 16 can be accomplished in timed sequence with the movement of blade 14 so that the windshield washing fluid is dispensed toward the glass at a time in the wipe cycle when it can be most efficiently used. As seen in FIGURE 1, the outlets 32 are positioned near the glass of windshield 12 so that the majority, if not all, of the dispensed fluid reaches its targeted destination. This is in contrast to many windshield washing mechanisms in common usage wherein fluid must traverse a distance approximately equal to the length of the wiper arm before reaching the target area.

The utility of the subject device is extended by fastening means 20 which cooperates with windshield wiping mechanisms of well-known design so that installation thereof can be accomplished as original equipment on a vehicle or can be supplied for the so-called "after market." In addition, fastening means 20 adapts itself for very quick and easy installation with no tools required and is adapted to be used with washing nozzles of various designs to suit the designer of the system. In addition, if the problem of a maintenance type occurs in the washing system, disassembly of the fluid delivery system herein described is accomplished very easily and very quickly thereby facilitating repairs. It is also important that the fastening means 20 be of a resilient material as well as material impervious to the elements in view of the environment in which the invention must operate. The present invention obviates not only the environmental problems but also adapts itself for easy installation.

While the embodiment of the present invention, as herein disclosed, constitutes a preferred form, it is to be understood that other forms might be adopted.

What is claimed is:

1. A fluid delivery system comprising: a support means; a rigid member supported by said support means for movement relative thereto through a given path; a flexible tube passing through said rigid member and which is adapted to have one end in communication with a fluid source; and a dispensing means connected to said rigid member and connected with the other end of said flexible tube for dispensing fluid when delivered thereto while said rigid member is being moved through its path, said rigid member having a wall portion provided with a non-circular opening and said dispensing means including a fastener means having spaced resilient flanges which frictionally grip opposite sides of said wall portion when connected thereto, one of said flanges being shaped complementary with said non-circular opening and being freely insertable through said opening until the other flange engages the rigid member, said fastener being rotatable when said one flange is inserted through said opening so that portions of said one flange and the other flange are disposed on and frictionally engage the opposite sides of the wall portion to connect the fastener to the rigid member.

2. A fluid delivery system as defined in claim 1 wherein said fastener means has a central through opening for receiving said other end of said flexible tube and with the side wall of said fastener means defining said opening sealingly engaging said tube along its other end portion, and wherein said dispensing means also includes a nozzle means connected with said fastener means and which sealingly engages said other end of said flexible tube.

3. A fluid delivery system as defined in claim 1 wherein said rigid member is a wiper-washer arm of a window cleaning apparatus for cleaning a window of an automotive vehicle and wherein the dispensing means is carried by said wiper-washer arm at a location in close proximity with the window.

4. A windshield washer fluid delivery system comprising: a washer arm; flexible tubing extending from a fluid source to a delivery area near the windshield at the end of the washer arm; fastener means including a resilient body and resilient projections for frictionally engaging said washer arm and said tubing for establishing a fixed relationship therebetween; and nozzle means carried by said fastener means for sealingly engaging said flexible tubing and said fastener means.

5. A windshield washer fluid delivery system according to claim 4 wherein said washer arm includes an elongated aperture having offset extremities and said fastener means has two levels of resilient extensions, a first level corresponding substantially in shape to the elongated aperture in said washer arm and a second level larger in dimension than said aperture for retaining said fastener means in engagement with said washer arm when said first level is inserted into said aperture and twisted.

6. A windshield washer fluid delivery system according to claim 4 wherein said flexible tubing is a flexible thermoplastic and said fastener means is a semirigid thermoplastic material.

References Cited

UNITED STATES PATENTS

| | | | |
|---|---|---|---|
| 3,149,361 | 9/1964 | Ziegler | 15—250.04 XR |
| 2,271,843 | 2/1942 | Newman et al. | 239—525 |
| 3,008,170 | 11/1961 | Marks | 239—284 XR |
| 3,010,473 | 11/1961 | McCurnin | 239—284 XR |

FOREIGN PATENTS

| | | |
|---|---|---|
| 1,294,338 | 4/1962 | France. |
| 1,094,131 | 12/1960 | Germany. |

PETER FELDMAN, *Primary Examiner.*

U.S. Cl. X.R.

239—284